Dec. 27, 1938.     J. HELGERUD     2,141,786
FRICTION CHUCK AND DRIVER
Filed June 14, 1937
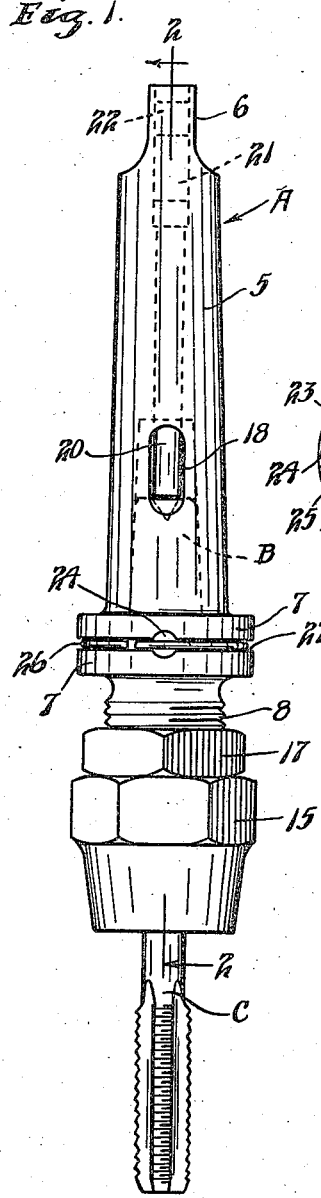
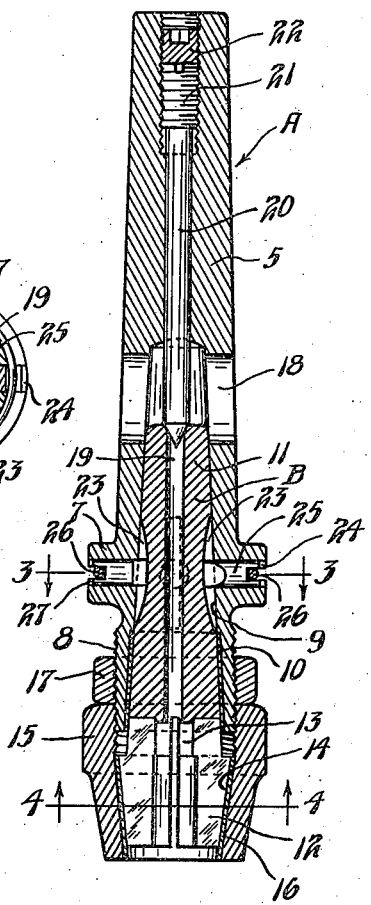
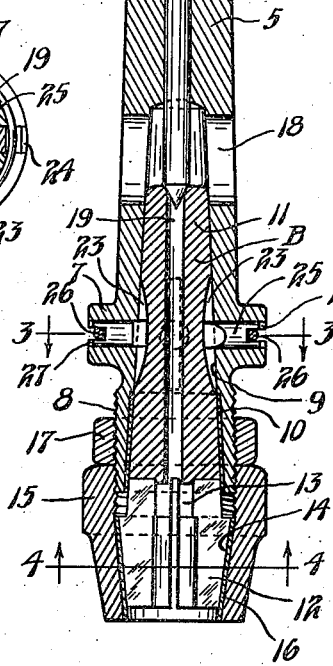
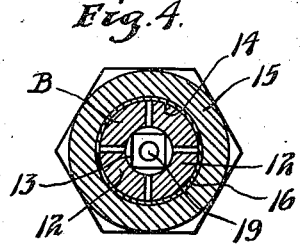
INVENTOR:
JOHN HELGERUD.
BY HIS ATTORNEYS.
Williamson & Williamson Patented Dec. 27, 1938

2,141,786

UNITED STATES PATENT OFFICE 2,141,786

FRICTION CHUCK AND DRIVER

John Helgerud, Minneapolis, Minn.

Application June 14, 1937, Serial No. 148,035

3 Claims. (Cl. 10—135)

This invention relates to friction chucks and drivers.

It is the general object of this invention to provide a novel and improved friction chuck and driver including a driver member and a tool holding driven member, the construction being such that the driven member will be caused to rotate with the driver member until the frictional resistance to the rotation of the driven member reaches a certain point and thereupon the driver member will be permitted to rotate relative to the driven member.

More specifically it is the object of the invention to provide a friction chuck and driver capable of holding such tools as taps, drills, screw drivers and the like, whereby the tool may be turned until certain frictional resistance is offered to its turning movement and thereupon the tool will remain stationary until the frictional resistance is removed while the driver is still being rotated. The purpose of this construction, of course, is to prevent injury or breakage of the tool.

The objects and advantages of the invention will more fully appear from the following description, made in connection with the accompanying drawing, in which like reference characters refer to the same or similar parts throughout the various views and in which, Fig. 1 is a plan view of a friction clutch and driver equipped with a tap and embodying the invention;

Fig. 2 is a longitudinal section taken on the line 2—2 of Fig. 1 as indicated by the arrows; and Figs. 3 and 4 are transverse sections taken respectively on the lines 3—3 and 4—4 of Fig. 2, as indicated by the arrows.

Referring to the drawing an elongated driver member is designated by the letter A. This member includes a tool shank portion 5 equipped with a tooth 6 at its rear end and tapering toward the rear end of the driver member A from a cylindrical flange 7 thereon rearwardly. Forward of the flange 7 the exterior surface of the driver member A is screw threaded to the forward end of the member, the screw threaded portion being designated by the numeral 8. An elongated opening defining conically tapering internal walls 9 is formed in the driver member and this opening extends from the forward end of the member rearwardly throughout approximately one half the length of the member A. The opening of course tapers toward the rear end of the member. The conical walls 9 are recessed slightly toward the forward end of the driver member A to receive a fiber gasket 10 of truncated conical shape. The inner surface of this gasket preferably carries graphite or similar non-friction material.

A driven member is designated generally by the letter B. This driven member has a rearwardly tapering shank 11 adapted to be received within the opening defined by the conical walls 9 of the driver member A. The forward part of the driven member B is centrally bored and diametrically grooved to form spring tool holding jaws 12, between which the shank of a tool such as the tap C illustrated or the shanks of numerous other tools can be received. Preferably the inner part of the bore in the forward portion of the driven member B is of square or other polygonal-shaped cross section as shown at 13 to engage the usual polygonal-shaped cross section of the inner end of the shank of such a tool as the tap C and prevent rotation of the tool relative to the driven member B. The jaws 12 have outer peripheral surfaces 14 forming portions of the surfaces of a cone which tapers toward the forward end of the driven member B.

Having screw threaded engagement with the screw threaded portion 8 of the driver member A is a jam nut 15, the inner surface of the forward part of which is forwardly tapered for cooperation with the tapered surfaces 14 of the jaws 12. Interposed between the tapered surface of the jam nut 15 and the tapered surfaces 14 is a fiber gasket 16 of truncated conical shape carrying graphite or similar non-frictional material. Rearwardly of the jam nut 15 a lock nut 17 is carried by the screw threaded portion 8 of the driver member A.

A cross slot 18 is cut in the shank 5 of the driver member A to run into the elongated opening therein adjacent the innermost position of the shank 11 of the driven member B. This cross slot 18 is for the purpose of permitting insertion of a tool, such as a wedge, to loosen the driven member B from the driver member A when the jam nut 15 is loosened.

The shank 11 of the driven member B is provided with a central longitudinal bore 19 to permit insertion of a pin to drive out any tool that may be jammed into the jaws 12 and held thereby.

The shank 5 of the driver member A is also provided with a central longitudinal bore running from the rear end of the driver member into the cross slot 18 to receive a pin 20 having a conically pointed forward end which may be received within the rear countersunk portion of bore 19. Pin 20 has a screw threaded head 21 at its rear end engaging with a screw threaded well in the rear end of shank 5 and the extreme rear end of this head is provided with a cerf to receive a screw driver. A plug 22 is also received within the well at the rear end of the shank 5 to prevent unintentional unloosening of the pin 20.

The exterior surface of the shank 11 of the driven member B at its medial portion taken longitudinally thereof forms a ratchet 23, longitudinal grooves being cut in the shank for this purpose. This ratchet 23 normally lies adjacent the flange 7 of the driver member A. A number of small openings 24 are cut radially through the flange 7 into the central longitudinal opening in the driver member A and received within the apertures 24 are toothed pawls 25 for cooperation with the ratchet 23. These pawls have teeth each provided with one beveled edge and one straight edge and the pawls are so arranged, as best shown in Fig. 3, relative to the ratchet 23 as to permit of rotation of the driver member A relative to the driven member B in one direction, but to prevent rotation of the driver member A relative to the driven member B in the opposite direction. The pawls 25 are held in spring pressed engagement with the ratchet 23 by means of a split circular spring 26 received within a groove 27 in the flange 7 and also received within grooved heads of the pawls 25.

Let us assume that the device is to be used for tapping an opening of a certain depth only in a piece of metal. The lock nut 17 having been loosened from its engagement with the jam nut 15 by running the locknut up on the screw threaded portion 8, the jam nut is loosened relative to the jaws 12 by running it down on the screw threaded portion 8. The shank of the tap C is then inserted in place between the jaws 12 and the jam nut 15 is then drawn up on the screw threaded portion 8. During the first part of its movement, the jam nut will cause radial compression of the spring jaws 12 to cause them to grip and center the tool C. During the latter part of its movement the jam nut 15 will force the driven member B rearwardly relative to the driver member A to carry the shank 11 into tight frictional engagement with the fiber gasket 10 and the conical walls 9 of the driver member. The lock nut 17 may then be drawn down against the jam nut 15 to tightly secure the jam nut in the adjusted position. The friction chuck and driver is now ready for use and it may be engaged in an ordinary lathe chuck or drill press chuck in the ordinary manner. As the driver member A is rotated by the lathe or drill press, the driven member B together with the tool C carried thereby, will be rotated therewith. As the tap C moves into the piece of metal being worked on, it will thread the internal wall of the apertured piece of metal and will continue to revolve until it strikes the bottom of the opening. At that time the driver member A will continue to revolve relative to the driven member B and the tool C without causing rotation of these two parts. Accordingly, the tool C will not be injured as it strikes the bottom of the opening in the work even though no depth gauge is used on the lathe or drill press. In other words, the driven member B and the tool C connected thereto will be rotated with the driver member A until such time as the tool meets sufficient resistance to its turning movement to equal the frictional resistance offered by engagement between the tapered shank 11, the fiber gasket 10 and the tapered wall 9 to turning movement of the driver member A relative to the driven member B and thereupon the driver member will continue to rotate without turning the driven member. By tightening the jam nut 15 on the screw threaded portion 8 of the driver member to a greater or lesser extent prior to the time that the equipment is used, variance can be made in the required resistance offered to the turning movement of the tool before slippage will occur.

Of course, the pawls 25 and the ratchet 23 are provided to positively cause the driven member and the tool carried thereby to be turned with the driver member when the driver member is rotated in the opposite direction than the tool working direction.

While the present device is particularly adapted for use to prevent injury of taps in tapping blind openings in material, it is also capable of use in connection with dies, drills, screw drivers and rotary tools of many different types.

It will, of course, be understood that various changes may be made in the form, details, arrangement and proportions of the various parts without departing from the scope of the present invention which, generally stated, consists in the matter shown and described and set forth in the appended claims.

Attention should be called to the fact that the pawls 25 can each be readily turned through 180° from their position shown in Fig. 3. It is thus possible to effectively use the device with taps for cutting left hand as well as right hand threads, as well as other tools which in their tool working action revolve in either direction.

What is claimed is:—

1. A friction chuck and driver comprising a driver member, a tool holding driven member having a tapered shank, said driver member having a tapered opening at one end to rotatably receive the shank of said driven member, said driven member including means for rotatably receiving and holding a tool therein, means for forcing the shank of said driven member into said opening to cause desired frictional resistance to rotational movement of said driver member relative to said driven member, means for locking said shank forcing means, a plurality of ratchet teeth on the shank of said driven member, and a reversible pawl supported by said driver member whereby the ratchet action of said ratchet teeth and pawl may be reversed upon reverse actuation of said chuck and driver.

2. A friction chuck and driver comprising a driver member having a tapered opening extending inwardly from its forward end, the exterior portion of the forward end of said driver being screw-threaded, a driven member having a tapered shank received within said opening and being rotatable therein, said shank having spring tool holding jaws at its forward end provided with forwardly tapered external surfaces, a friction reducing element interposed between said driver member and said driven member, and a jam nut carried by the screw-threaded part of said driver member and having forwardly tapered inner walls cooperating with the forwardly tapering portions of said jaw, said nut exerting a tool gripping force on said jaws for rigid engagement of said tool and said nut also forcing said driven member axially inwardly in the opening in said driver member to produce yieldable frictional engagement between said members, and means for locking said jam nut against movement to maintain a pre-determined degree of frictional engagement.

3. A frictional chuck and driver comprising a driver member, a tool holding driven member having a tapered shank, said driver member having a tapered opening at one end to receive the shank of said driven member, said driven member including means for holding a tool therein, means for forcing the shank of said driven member into said opening to cause desired frictional resistance to rotational movement of said driver member relative to said driven member, a plurality of ratchet teeth on the shank of said driven member, a reversible pawl supported by said driver member whereby the ratchet action of said ratchet teeth and pawl may be reversed upon reverse actuation of said chuck and driver, said pawl mechanism including a pin whose inner end has an inclined face and a straight face, said driver member having a radial aperture adapted to slidably receive said pawl and having an annular groove intersecting said aperture, and a spring retaining ring lying within said groove and yieldably resisting outward radial movement of said pawl.

JOHN HELGERUD.